United States Patent
Lee et al.

(10) Patent No.: US 8,307,459 B2
(45) Date of Patent: Nov. 6, 2012

(54) BOTNET EARLY DETECTION USING HYBRID HIDDEN MARKOV MODEL ALGORITHM

(75) Inventors: Hahn-Ming Lee, Taipei (TW); Ching-Hao Mao, Taipei (TW); Yu-Jie Chen, Taipei (TW); Yi-Hsun Wang, Taipei (TW); Jerome Yeh, Taipei (TW); Tsu-Han Chen, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 293 days.

(21) Appl. No.: 12/726,272

(22) Filed: Mar. 17, 2010

(65) Prior Publication Data

US 2011/0004936 A1  Jan. 6, 2011

(30) Foreign Application Priority Data

Jul. 3, 2009  (TW) .............................. 98122517 A

(51) Int. Cl.
 G06F 7/04  (2006.01)
 G06F 11/00  (2006.01)
(52) U.S. Cl. ......... 726/30; 726/23; 704/256; 704/256.1; 704/256.5
(58) Field of Classification Search ...................... 726/26
 See application file for complete search history.

(56) References Cited

U.S. PATENT DOCUMENTS 6,622,150 B1 *  9/2003  Kouznetsov et al. ................. 1/1
 2010/0138377 A1 *  6/2010  Wright et al. ................... 706/52

OTHER PUBLICATIONS

"Defending DDos Attacks Using Hidden Markov Models and Cooperative Reinforcement Learning", Huang et al. Springer-Verlag Berlin Heidelberg, 2007.*
"Detecting Botnets Using Hidden Markov Models on Network Traces", Wade Gobel, Dept. of Computer Science and Engineering, University of Connecticut, Oct. 3, 2008.*
"A Tutorial on Hidden Markov Models and Selected Applications in Speech Recognition", Lawrence R. Rabiner, Proceedings of the IEEE, vol. 77, No. 2, Feb. 1989.*
"A Tutorial on Hidden Markov Models", Desai et al. Dept. of Electrical Engineering, IIT Bombay. May 1996.*

* cited by examiner

Primary Examiner — Taghi Arani
Assistant Examiner — Mohammad L Rahman

(57) ABSTRACT

A botnet detection system is provided. A bursty feature extractor receives an Internet Relay Chat (IRC) packet value from a detection object network, and determines a bursty feature accordingly. A Hybrid Hidden Markov Model (HHMM) parameter estimator determines probability parameters for a Hybrid Hidden Markov Model according to the bursty feature. A traffic profile generator establishes a probability sequential model for the Hybrid Hidden Markov Model according to the probability parameters and pre-defined network traffic categories. A dubious state detector determines a traffic state corresponding to a network relaying the IRC packet in response to reception of a new IRC packet, determines whether the IRC packet flow of the object network is dubious by applying the bursty feature to the probability sequential model for the Hybrid Hidden Markov Model, and generates a warning signal when the IRC packet flow is regarded as having a dubious traffic state.

18 Claims, 4 Drawing Sheets

BOTNET EARLY DETECTION USING HYBRID HIDDEN MARKOV MODEL ALGORITHM

CROSS REFERENCE TO RELATED APPLICATIONS

This application claims priority of Taiwan Patent Application Ser. No. 098122517, filed Mar. 7, 2009. The contents of the application are hereby incorporated by reference.

BACKGROUND

The invention relates to computer systems and methods, and in particular to a botnet detection system and method.

This section is intended to introduce the reader to various aspects of the art, which may be related to various aspects of the present invention, which are described and/or claimed below. This discussion is believed to be helpful in providing the reader with background information to facilitate a better understanding of the various aspects of the present invention. Accordingly, it should be understood that these statements are to be read given said understanding, and not as admissions of prior art.

Recently, malicious botnet activities have increased. A botmaster controls bot programs for pure malice. The botmaster activates the bot program to execute malicious activities, such as spam dissemination, phishing, DDos attacks and practice of blackmail.

Conventionally, known virus codes are utilized in a botnet detection method. The conventional method, however, cannot effectively detect a botnet during an early stage of malice.

Accordingly, an effective botnet detection method is needed.

SUMMARY

Certain aspects commensurate in scope with the claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

A botnet detection system is provided. A bursty feature extractor receives an Internet Relay Chat (IRC) packet value from a detection object network, and determines a bursty feature accordingly. A Hybrid Hidden Markov Model (HHMM) parameter estimator determines probability parameters for a Hybrid Hidden Markov Model according to the bursty feature. A traffic profile generator establishes a probability sequential model for the Hybrid Hidden Markov Model according to the probability parameters and pre-defined network traffic categories. A dubious state detector determines a traffic state corresponding to a network relaying the IRC packet in response to reception of a new IRC packet, determines whether the IRC packet flow of the object network is dubious by applying the bursty feature to the probability sequential model for the Hybrid Hidden Markov Model, and generates a warning signal when the IRC packet flow is regarded as having a dubious traffic state.

A botnet detection method is provided. The method comprises the steps of: receiving an Internet Relay Chat (IRC) packet value from an detection object network, and determining a bursty feature accordingly; determining probability parameters for a Hybrid Hidden Markov Model according to the bursty feature; establishing a probability sequential model for the Hybrid Hidden Markov Model according to the probability parameters and pre-defined network traffic state categories; determining a traffic state corresponding to a network relaying the IRC packet in response to reception of a new IRC packet; determining whether the IRC packet flow of the object network is dubious by applying the bursty feature to the probability sequential model for the Hybrid Hidden Markov Model; and generating a warning signal when the IRC packet flow is regarded as having a dubious traffic state.

BRIEF DESCRIPTION OF DRAWINGS

The invention can be more fully understood by reading subsequent detailed description and examples with references made to the accompanying drawings, wherein.

DETAILED DESCRIPTION

One or more specific embodiments of the invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacturing for those with ordinary skill in the art having the benefit of this disclosure.

In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense. The leading digit(s) of reference numbers appearing in the figures corresponds to the Figure number, with the exception that the same reference number is used throughout to refer to an identical component which appears in multiple Figures. It should be understood that many of the elements described and illustrated throughout the specification are functional in nature and may be embodied in one or more physical entities or may take other forms beyond those described or depicted.

Figure 1:
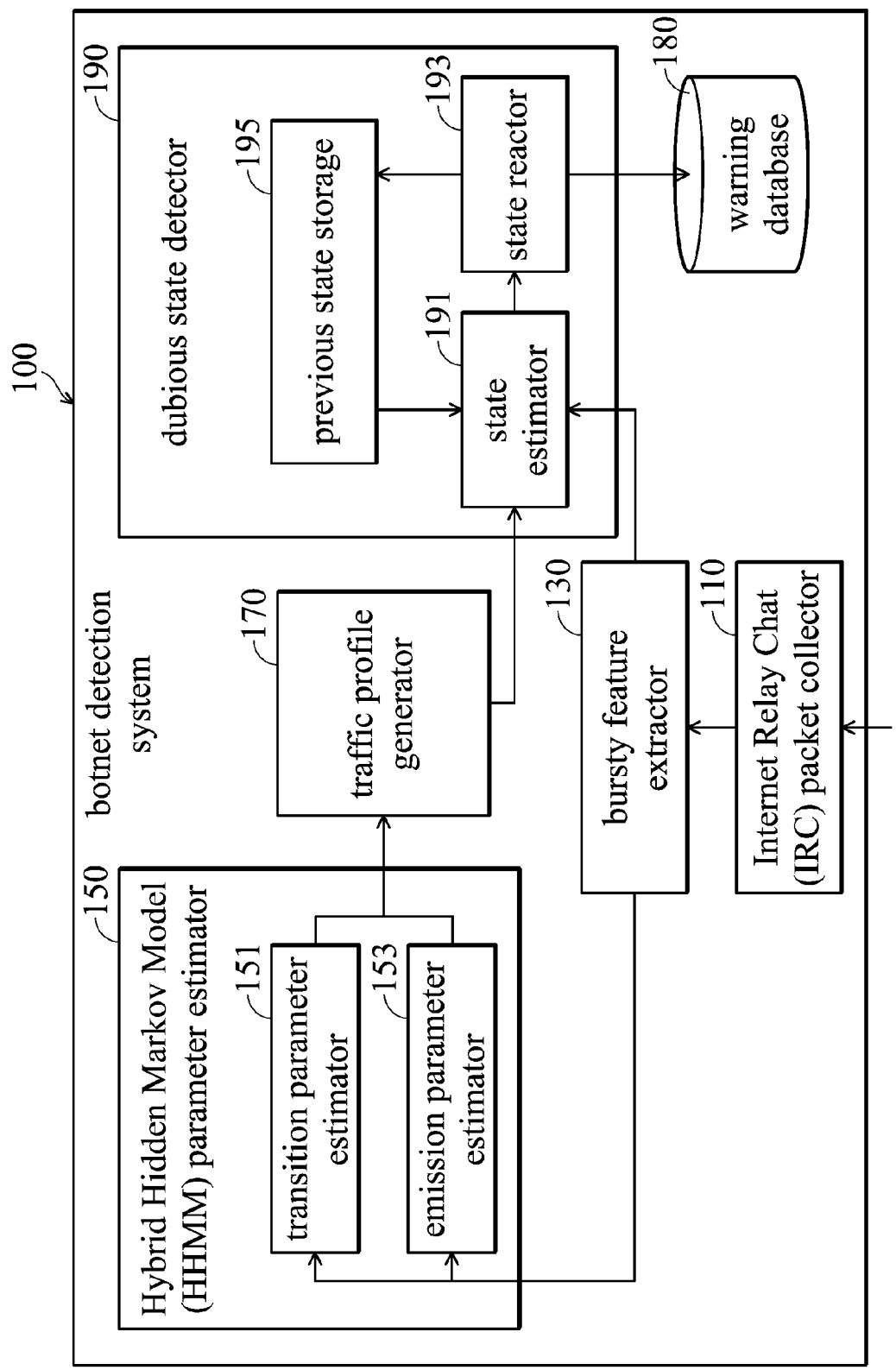
FIG. 1 is a schematic view of an embodiment of a botnet detection system.

FIG. 1 is a schematic view of an embodiment of a botnet detection system.

As shown in FIG. 1, the botnet detection system 100 comprises: an Internet Relay Chat (IRC) packet collector 110, a bursty feature extractor 130, a Hybrid Hidden Markov Model (HHMM) parameter estimator 150, a traffic profile generator 170, a dubious state detector 190 and a warning database 180.

The Internet Relay Chat (IRC) packet collector 110 collects packets from a detection object network, and selects IRC packets from the collected packets, retrieves the IRC packet value from the selected IRC packets, and transmits the IRC packet value to the bursty feature extractor 130.

The bursty feature extractor 130 receives the IRC packet value from the Internet Relay Chat (IRC) packet collector 110, and determines a bursty feature according to the received IRC packet value. Here, the bursty feature comprises an average size of packets collected in one second and an average time interval between packets collected in one second.

The Hybrid Hidden Markov Model (HHMM) parameter estimator 150 determines probability parameters for a Hybrid Hidden Markov Model according to the bursty feature. The probability parameters comprise a transition probability parameter and an emission probability parameter.

The Hybrid Hidden Markov Model (HHMM) parameter estimator 150 comprises a transition parameter estimator 151 and an emission parameter estimator 153.

The transition parameter estimator 151 calculates a transition probability for transition between pre-defined traffic states according to the bursty feature, and generates the probability parameters accordingly. The transition parameter estimator 151 uses a conditional probability in cooperation with a statistics counting rule to determine the ratio of a traffic state of each instance to?? a whole training set, wherein the ratio is the transition probability corresponding to the instance.

The emission parameter estimator 153 determines a probability that the bursty feature will conform to the pre-defined traffic states according to the bursty feature, and generates the emission probability parameters accordingly. The emission parameter estimator 153 uses a conditional probability in cooperation with a statistics counting rule to determine a probability for a feature vector extracted from each of the instances to occur in the traffic state, wherein the probability is regarded as the emission probability parameter.

The traffic profile generator 170 establishes a probability sequential model for the Hybrid Hidden Markov Model according to the probability parameters and pre-defined network traffic categories. Here, the pre-defined traffic states comprise: a normal traffic state, an idle traffic state, and an active traffic state. The idle traffic state and the active traffic state are regarded as dubious traffic states.

The Hybrid Hidden Markov Model (HHMM) parameter estimator 150 and traffic profile generator 170 operate during a training stage, generate a probability sequential model for the Hybrid Hidden Markov Model according to received IRC packets, and provide the probability sequential model for further use.

When the Internet Relay Chat (IRC) packet collector 110 has received a new IRC packet from a detection object network, and the corresponding bursty feature has been generated by the bursty feature extractor 130, the dubious state detector 190 determines a traffic state corresponding to a network relaying the IRC packet in response to reception of the new IRC packet, determines whether the IRC packet flow of the detection object network is dubious by applying the bursty feature to the probability sequential model for the Hybrid Hidden Markov Model, and generates a warning signal when the IRC packet flow is regarded as having a dubious traffic state.

The dubious state detector 190 comprises a state estimator 191, a state reactor 193, and a previous state storage 195.

The state estimator 191 determines ?? probabilities corresponding to each of the pre-defined network traffic state (a normal traffic state, an idle traffic state, and an active traffic state) in the Hybrid Hidden Markov Model (HHMM) according to the previously determined bursty feature and traffic state. The state estimator 191 uses a forward algorithm to determine probability for the network traffic state category for the moment corresponding to each pre-defined network traffic states. In other words, the state estimator 191 calculates the sum of the bursty feature determined according to the Hybrid Hidden Markov Model (HHMM) to determine probability for the network traffic state category for the moment corresponding to each pre-defined network traffic state.

The state reactor 193 determines the traffic state category of the object network for the moment according to probability for each of the network traffic states, and determines whether the network traffic state category for the moment is the network traffic state that should be on an alert status. When network traffic state category for the moment is a idle traffic state or the active traffic state, the state reactor 193 issues a corresponding warning signal.

The previous state storage 195 stores the network traffic state category that has been determined by the state reactor 193, and provides the stored network traffic state category to the state estimator 191 to calculate, for a next traffic flow, the probabilities corresponding to each network traffic state.

The warning database 180 stores the warning signal for future use.

Figure 2:
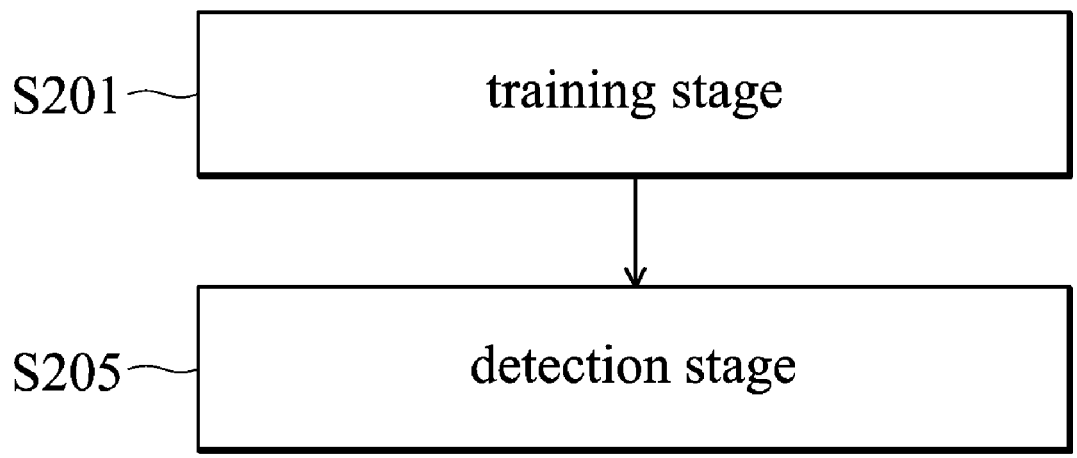
FIG. 2 is a flowchart of an embodiment of a botnet detection method.

FIG. 2 is a flowchart of an embodiment of a botnet detection method.

Step S201 is a training stage establishing a sequential model for the Hybrid Hidden Markov Model (HHMM) corresponding to a detection object network. Step S205 is a detection stage determining the network traffic state category for the moment according to the established sequential model.

Figure 3:
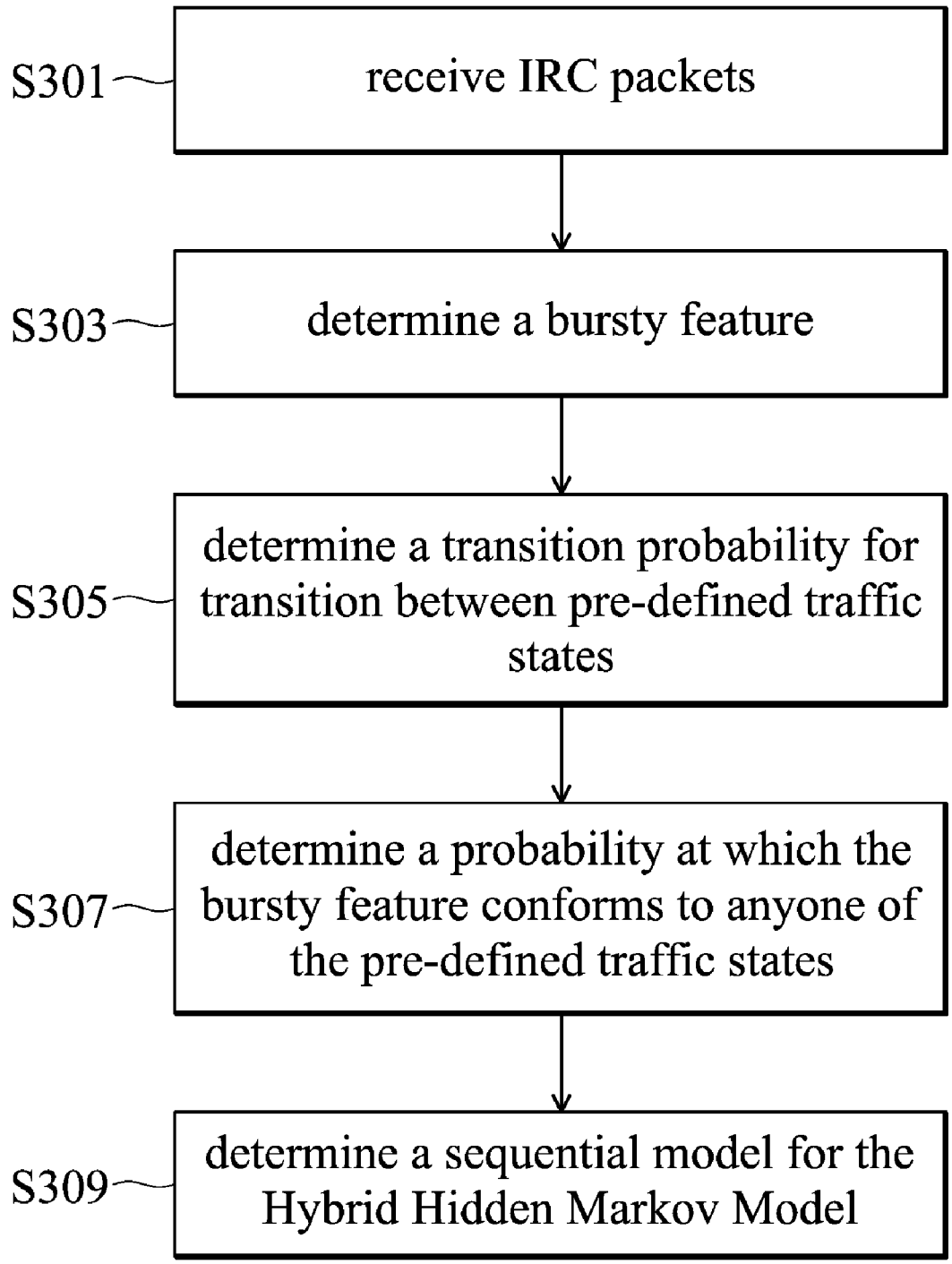
FIG. 3 is a flowchart of the training stage of FIG. 2.

FIG. 3 is a flowchart of the training stage of FIG. 2.

In step S301, IRC packets are received. In step S303, a bursty feature is determined. Here, the bursty feature comprises an average size of packets collected in one second and an average time interval between packets collected in one second.

In step S305, a transition probability for transition between pre-defined traffic states is determined according to the bursty feature, and probability parameters are generated accordingly. For example, a conditional probability and statistics counting rule are used to determine the ratio of a traffic state of each instance within a whole training set, wherein the ratio is the transition probabilities corresponding to the instance.

In step S307, a probability at which the bursty feature conforms to anyone of the pre-defined traffic states is determined according to the bursty feature, and probability parameters are generated accordingly.

In step S309, a sequential model for the Hybrid Hidden Markov Model is determined according to the transition probability parameter and emission probability parameter.

Figure 4:
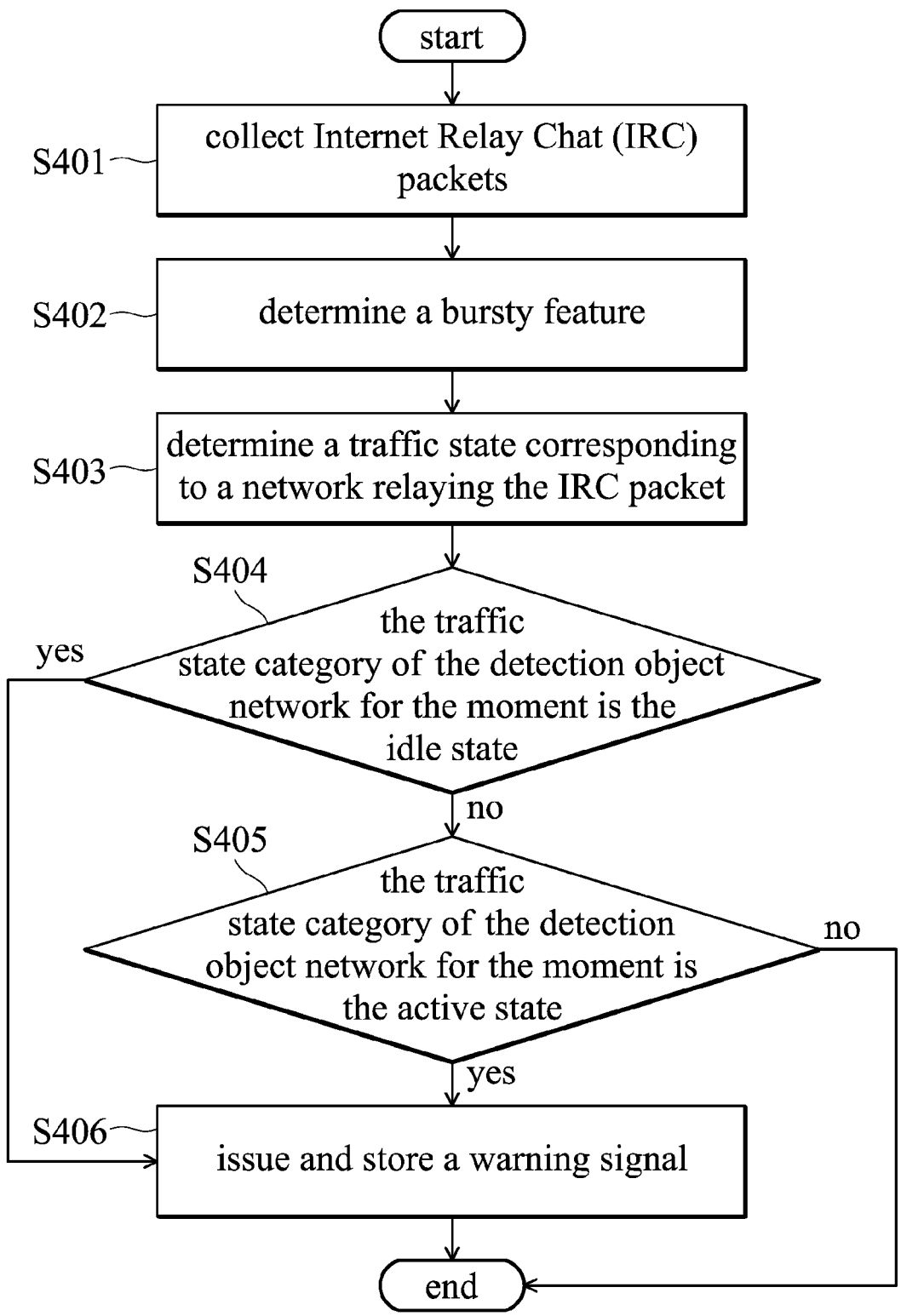
FIG. 4 is a flowchart of the detection stage of FIG. 2.

FIG. 4 is a flowchart of the detection stage of FIG. 2.

In step S401, Internet Relay Chat (IRC) packets are collected from the detection object network, and IRC packets are selected from the collected packets. The IRC packet value is retrieved from the selected IRC packets, and then the IRC packet value is transmitted to the bursty feature extractor.

In step S402, a bursty feature is determined. Here, the bursty feature comprises an average size of packets collected in one second and an average time interval between packets collected in one second.

In step S403, a traffic state corresponding to a network relaying the IRC packet is determined in response to reception of a new IRC packet, and it is determined whether the IRC packet flow of the detection object network is dubious by applying the bursty feature to the probability sequential model for the Hybrid Hidden Markov Model. In addition, a warning signal is issued when the IRC packet flow is regarded as having a dubious traffic state.

In step S404, it is determined whether the traffic state category of the detection object network for the moment is the idle state, and if so, the method proceeds to step S406, otherwise, the method proceeds to step S405.

In step S405, it is determined whether the traffic state category of the detection object network for the moment is the active state, and if so, the method proceeds to step S406, otherwise, the method ends.

In step S406, a warning signal is issued and stored for further use.

As described, in the botnet detection system, the idle state is defined and detected. Accordingly, botnet traffic can be detected during an early stage of malice.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A botnet detection system, comprising:
   a bursty feature extractor, implemented by a computer, receiving an Internet Relay Chat (IRC) packet value from a detection object network, and determining a bursty feature accordingly;
   a Hybrid Hidden Markov Model (HHMM) parameter estimator, implemented by the computer, determining probability parameters for a Hybrid Hidden Markov Model according to the bursty feature;
   a traffic profile generator, implemented by the computer, establishing a probability sequential model for the Hybrid Hidden Markov Model according to the probability parameters and pre-defined network traffic categories;
   a dubious state detector, implemented by the computer, determining a traffic state corresponding to a network relaying the IRC packet in response to reception of a new IRC packet, determining whether the IRC packet flow of the detection object network is dubious by applying the bursty feature to the probability sequential model for the Hybrid Hidden Markov Model, and generating a warning signal when the IRC packet flow is regarded as having a dubious traffic state, wherein the dubious state detector comprises:
      a state estimator, determining probabilities corresponding to each of the pre-defined network traffic states in the Hybrid Hidden Markov Model (HHMM) according to the previously determined bursty feature and traffic state; and
      a state reactor, determining the traffic state category of the detection object network for the moment according to probability for each of the network traffic states, and determining whether the network traffic state category for the moment is the network traffic state that should be on an alert status; and
      a previous state storage, storing the network traffic state category that has been determined by the state reactor, and providing the stored network traffic state category to the state estimator to calculate, for a next traffic flow, the probabilities corresponding to each network traffic state.

2. The botnet detection system of claim 1, further comprising an IRC packet collector, implemented by the computer, for collecting packets from the detection object network, and selecting IRC packets from the collected packets, retrieving the IRC packet value from the selected IRC packets, and transmitting the IRC packet value to the bursty feature extractor.

3. The botnet detection system of claim 1, wherein the bursty feature comprises an average size of packets collected in one second and an average time interval between packets collected in one second.

4. The botnet detection system of claim 1, wherein the probability parameters comprise a transition probability parameter and an emission probability parameter, and the Hybrid Hidden Markov Model (HHMM) parameter estimator comprises:
   a transition parameter estimator, calculating a transition probability for transition between pre-defined traffic states according to the bursty feature, and generating the probability parameters accordingly; and
   an emission parameter estimator, determining a probability that the bursty feature will conform to the pre-defined traffic states according to the bursty feature, and generating the emission probability parameters accordingly.

5. The botnet detection system of claim 4, wherein the transition parameter estimator uses a conditional probability in cooperation with a statistics counting rule to determine the ratio of a traffic state of each instance within a whole training set, wherein the ratio is the transition probability corresponding to the instance.

6. The botnet detection system of claim 4, wherein the emission parameter estimator uses a conditional probability in cooperation with a statistics counting rule to determine a probability for a feature vector extracted from each of the instances to occur in the traffic state, wherein the probability is regarded as the emission probability parameter.

7. The botnet detection system of claim 1, wherein the pre-defined traffic states comprise a normal traffic state, an idle traffic state, and an active traffic state, wherein the idle traffic state and the active traffic state are regarded as dubious traffic states.

8. The botnet detection system of claim 1, wherein the state estimator calculates the sum of the bursty feature determined according to the Hybrid Hidden Markov Model (HHMM) to determine probability for the network traffic state category for the moment corresponding to each pre-defined network traffic state.

9. The botnet detection system of claim 1, further comprising a warning database for storing the warning signal for future use.

10. A botnet detection method, comprising:
    receiving, by a computer, an Internet Relay Chat (IRC) packet value from a detection object network, and determining a bursty feature accordingly;
    determining, by the computer, probability parameters for a Hybrid Hidden Markov Model (HHMM) according to the bursty feature;
    establishing, by the computer, a probability sequential model for the Hybrid Hidden Markov Model (HHMM) according to the probability parameters and pre-defined network traffic state categories;
    determining, by the computer, a traffic state corresponding to a network relaying the IRC packet in response to reception of a new IRC packet, determining whether the IRC packet flow of the object network is dubious by applying the bursty feature to the probability sequential model for the Hybrid Hidden Markov Model, and generating a warning signal when the IRC packet flow is regarded as having a dubious traffic state;
    determining, by the computer, probability corresponding to each of the pre-defined network traffic state in the Hybrid Hidden Markov Model (HHMM) according to the bursty feature and the traffic state having been determined previously;

determining, by the computer, the traffic state category of the object network for the moment according to the probability of each of the network traffic states, and determining whether the network traffic state category for the moment is the network traffic state that should be on the alert; and storing, by the computer, the network traffic state category that has been determined by the state reactor, and providing the stored network traffic state category to the state estimator to calculate, for a next traffic flow, the probability corresponding to each network traffic state.

11. The botnet detection method of claim 10, further collecting, by the computer, packets from the detection object network, and selecting IRC packets from the collected packets, retrieving the IRC packet value from the selected IRC packets, and transmitting the IRC packet value to the bursty feature extractor.

12. The botnet detection method of claim 10, wherein the bursty feature comprises an average size of packets collected in one second and an average time interval between packets collected in one second.

13. The botnet detection method of claim 10, wherein the probability parameters comprise a transition probability parameter and an emission probability parameter, and the botnet detection method further comprises:

calculating a transition probability for transition between pre-defined traffic states according to the bursty feature, and generating the probability parameters accordingly; and determining a probability that the bursty feature will conform to the pre-defined traffic states according to the bursty feature, and generating the emission probability parameters accordingly.

14. The botnet detection method of claim 13, further using a conditional probability in cooperation with a statistics counting rule to determine the ratio of a traffic state of each instance within a whole training set, wherein the ratio is the transition probability corresponding to the instance.

15. The botnet detection method of claim 13, further using a conditional probability in cooperation with a statistics counting rule to determine a probability for a feature vector extracted from each of the instances to occur in the traffic state, wherein the probability is regarded as the emission probability parameter.

16. The botnet detection method of claim 10, wherein the pre-defined traffic states comprise a normal traffic state, an idle traffic state, and an active traffic state, wherein the idle traffic state and the active traffic state are regarded as dubious traffic states.

17. The botnet detection method of claim 10, further calculating the sum of the bursty feature determined according to the Hybrid Hidden Markov Model (HHMM) to determine the probability of the network traffic state category for the moment corresponding to each pre-defined network traffic state.

18. The botnet detection method of claim 10, further comprising a warning database for storing the warning signal for future use.

* * * * *